(12) United States Patent
Sanfilippo

(10) Patent No.: US 12,016,476 B1
(45) Date of Patent: Jun. 25, 2024

(54) GLASSWARE FOR MAKING A MULTI-LAYER BEVERAGE, AND A METHOD OF USING THE SAME

(71) Applicant: John Sanfilippo, Algonquin, IL (US)

(72) Inventor: John Sanfilippo, Algonquin, IL (US)

( * ) Notice: Subject to any disclaimer, the term of this patent is extended or adjusted under 35 U.S.C. 154(b) by 0 days.

(21) Appl. No.: 18/321,256

(22) Filed: May 22, 2023

(51) Int. Cl.
*A47G 19/20* (2006.01)
*A23P 20/20* (2016.01)
*A47G 19/22* (2006.01)

(52) U.S. Cl.
CPC .......... *A47G 19/2205* (2013.01); *A23P 20/20* (2016.08)

(58) Field of Classification Search
CPC .... A47G 19/2205; A23P 20/20; A47J 43/042; A47J 43/27
See application file for complete search history.

(56) References Cited

U.S. PATENT DOCUMENTS

| | | | | |
|---|---|---|---|---|
| 2,740,571 A | * | 4/1956 | Busto | A47J 43/27 |
| | | | | 99/534 |
| 3,185,189 A | * | 5/1965 | Reid | B67C 11/02 |
| | | | | 141/391 |
| 3,333,738 A | * | 8/1967 | Goss | A47J 43/27 |
| | | | | 222/548 |
| 3,897,571 A | * | 7/1975 | Homler | A23G 9/20 |
| | | | | 426/567 |
| 4,050,484 A | * | 9/1977 | Danyo | B67D 1/06 |
| | | | | 141/34 |
| 5,163,488 A | * | 11/1992 | Basch | A47J 43/27 |
| | | | | 141/286 |
| 5,997,936 A | | 12/1999 | Jimenez-Laguna | |
| 7,013,933 B2 | | 3/2006 | Sher et al. | |
| D539,091 S | | 3/2007 | Mansfield | |
| 7,243,812 B2 | | 7/2007 | Mansfield | |
| 7,523,840 B2 | | 4/2009 | Mansfield | |
| D596,461 S | | 7/2009 | Mansfield | |
| 8,272,529 B2 | | 9/2012 | Mansfield | |
| 9,717,266 B2 | | 8/2017 | Wild et al. | |
| 2006/0021986 A1 | * | 2/2006 | Mansfield | B65D 1/265 |
| | | | | 220/506 |
| 2007/0235103 A1 | | 10/2007 | Taverna | |
| 2007/0267424 A1 | * | 11/2007 | Marks | A47G 19/2205 |
| | | | | 220/703 |

(Continued)

OTHER PUBLICATIONS

Jen. "How to pour a layered cocktail." Accessed Aug. 28, 2023. <https://mixthatdrink.com/how-to-pour-a-layered-cocktail>. May 20, 2009. (Year: 2009).*

(Continued)

*Primary Examiner* — Ericson M Lachica
(74) *Attorney, Agent, or Firm* — Dunlap Bennett & Ludwig, PLLC

(57) ABSTRACT

A recipe for making a multi-layer beverage in a container having a platform disposed in a middle third of an internal chamber of the container, wherein the recipe includes adding a first liquid with a first density so that if defines a top off elevation downward of the platform. Then adding along a sidewall of the container a second liquid having a second density greater than the first density so as to urge the top off elevation of the first liquid approximately coplanar with a plane of the platform. Finally, floating a third liquid off the platform wherein the third liquid forms a third layer on the top off elevation of the first liquid with the second liquid forming a lowest layer.

11 Claims, 13 Drawing Sheets

(56) References Cited

U.S. PATENT DOCUMENTS

| | | | |
|---|---|---|---|
| 2016/0249765 A1* | 9/2016 | Perrin | A47J 31/4496 |
| | | | 222/129.4 |
| 2018/0055278 A1* | 3/2018 | Hunt | A47J 43/27 |
| 2020/0178571 A1* | 6/2020 | Ragnarsson | A23F 3/405 |
| 2020/0190449 A1* | 6/2020 | Hakim | A23L 2/52 |
| 2022/0371877 A1 | 11/2022 | Tatera et al. | |

OTHER PUBLICATIONS

Difford, Simon. "How to layer a cocktail." Accessed Aug. 28, 2023. <https://www.diffordsguide.com/encyclopedia/320/cocktails/how-to-layer-a-cocktail>. Oct. 25, 2020. (Year: 2020).*

Graham, Colleen. "Specific Gravity Chart for Layering Cocktails and Shots." Accessed Aug. 29, 2023. <https://www.thespruceeats.com/layering-drinks-and-shots-gravity-chart-760326>. Oct. 12, 2021. (Year: 2021).*

* cited by examiner

GLASSWARE FOR MAKING A MULTI-LAYER BEVERAGE, AND A METHOD OF USING THE SAME

BACKGROUND OF THE INVENTION

The present invention relates to mixology and more particularly, to glassware for making a multi-layer beverage, and a method of using the same to make a multi-layer beverage.

Alcoholic beverages with multiple layers are eye catching and can sell themselves. Multi-layer beverages and their preparation, however, are fraught with challenges.

For one, many multi-layer beverages are not practical for business because of slow pouring and the difficulties and pitfalls involved in their proper layering. The pitfalls of layering drinks include at least the following:

Pitfall 1: Dipping in the tip of the spoon slightly through the existing layer. The new layer being poured rolls down the spoon. Even the steadiest of hands can move the spoon, problematically creating a ripple through the existing layer and thereby making it weaker. This will start mixing the layers sooner, rather than building the new layer on top of the existing layer. Ideally, when compiling a new layer rippling of the sublayer is prevented or minimized, whereby adjacent layers will form stronger bonds to create barriers between the layers.

Pitfall 2: Holding the spoon and liquid too high, wherein the spoon is held flat allowing the liquid to pour and disperse evenly across the back of the spoon. Although this is the correct flow for the liquid, positioning high above the glass causes the liquid to have a longer drop to the surface of the drink. Once it hits the surface, it drops significantly below the existing layer's surface, ripples it, and weakens the barriers between the layers. The drop causes the weakened barriers, and as a result the bonds between the layers could cause the breakdown of the layers to occur sooner. Often times, this will cause color migration between the layers and cause loss in color definition and the layers to dissipate in a shorter amount of time.

Pitfall 3: Spoon held at a high angle with the tip at the surface level, wherein the pour is towards the neck of the spoon. The position of the pour and the angle of the spoon concentrates the flow at that angle while running down the metal of the spoon. Although some droplets might fall towards the back of the spoon, the majority compile together and create a downward pressure at the front of the spoon. This is not ideal for layering as you do not want that much pressure in one specific area. Think of the analogy of washing your hands. If you were to place your forearm and hand horizontally under the faucet, with water dropping down the back of your hand, the water would disperse evenly across your hand. Now the human hand is not symmetrical, but you will find that in both instances a liquid can cling to the bottom of an object before it becomes too heavy and drops. Using the same hand under the faucet, tilt your elbow upward so your hand is at a 45° angle, you will notice that if you spread your fingers most of the water all runs down your hand and a significant amount continues all the way down your fingers rather than dropping between the gaps. When this is applied to a symmetrical spoon, this causes most of the new layer to have pressure in one area. Again, concentrated pressure in one area is not beneficial for building a new layer. Only after it spreads around the sides of the spoon and across the surface will the new layer become sound. Not only can this cause inconsistent layers, but it will need to be done slower and with more precision.

Pitfall 4: Spoon held at a high angle with the tip at the surface level, wherein the pour is towards the tip of the spoon and close to the inner edge of the glass. This can be a slightly better technique than above, but it would still take time for the new layer to spread across the top surface area. Not only would this take time, but there are hidden challenges while pouring and holding the spoon. While trying to pour near the tip of the spoon, it's easy to miss hitting the spoon as keeping the spoon steady while pouring consistently can be challenging. If you miss, you might as well drop the liquid in as the spoon no longer serves a purpose in aiding the consistency of the layers. What some people will do is place the tip of the spoon right at the edge of the surface level, but also rest the tip of the spoon against the inside of the glass. In this scenario, a similar situation to how a liquid clings to and runs down your fingers under a faucet, the liquid can cling to the spoon, but it can also cling against the glass wall slowing down the pressure of the pour. This technique can help people who have trouble keeping a steady hand or pour, but it continues to be more time-consuming waiting for the new layer to spread across the surface. It can also be more mistake prone when trying to speed up the process because the new layer takes time to drift across the surface rather than utilizing the whole surface area in the first place.

Separately, most multi-layer recipes are usually shots. For taller (non-shot sized) mixed drinks, multi-layer recipes tend to result in larger portions, and in the context of alcoholic beverages, these drinks are usually too sweet or bitter in larger portions, and so these larger portions usually leave the consumer feeling bloated, rather than refreshed.

Additionally, glassware in which multi-layer drinks are prepared is not dimensioned and adapted to facilitate the mixing of the multi-layer drink nor accentuate the resulting drink. Current glassware, for multi-layer recipes, leave the colors of the resulting drink disproportional with the colors bleeding into one another. As a corollary, repeatedly making the multi-layer drink identical to an original is difficult. This is highly problematic since a multi-layer drink's first impression is visual in nature, and so multi-layer drinks can—at a glance—fail the eye test when their different layers/colors bleed into one another, when the division of colors disappear, or when there is a color change or a haze into another color layer. The color separations sometimes appear in different places in the glass. Moreover, if the glass needs to be transported to a table, any subtle shift of the drink will alter the colors as described above.

In terms of alcoholic beverages with multiple layers, it can be difficult to repeatably make on demand for customers at a bar or restaurant, where muddled aesthetics (regardless of flavor) is bad for business. At best, inconsistency usually only leads to one or two sales, and almost never more. Summer themes and designs are important to selling new alcoholic drinks. However, the theme or aesthetics mean nothing if the flavors do not mesh.

In short, a considerable amount of multi-layer recipes fail to gain any significant traction as they fail the eyeball test, or involve too many steps and ingredients making its creation impractical in a fast-paced establishment, or some of the ingredients are non-liquids that customers are leery of.

A need exists for glassware for repeatedly preparing multi-layered beverages, wherein the glassware facilitates combining liquid elements in a repeatable manner.

The goal for a theme-drink recipe would be on a hot summer day, when groups of people are out with their friends, this would be the first drink they would think of when they want to buy a round of drinks to share with their friends. Thus being able to make identical aesthetically pleasing/proportional drinks, would result in a business to be able to pre-pour/pre-batch rounds of the beverage for display/decor purposes as people and groups will then be attracted to imbibe from the drinks on display.

SUMMARY OF THE INVENTION

The present invention embodies a glassware that enables a mixologist or bartender to repeatable make a plurality of multi-layer drinks that look identical if they use the same ingredients and the same mixing process disclosed herein.

The physical structure of the glassware drives the outcome of pouring and serving the drink. If the inventive procedure is not followed correctly, the color separations and flavors may become an undistinguishable mess. When the color separations fail, the product will no longer look aesthetically pleasing to the customer and will be counter-productive in driving sales.

The drink is embodied in the glassware it is prepared in, and this glassware also visually compliments the drink. A wider lip, good amount of slope, and a narrower base may help accentuate the bottom layer to make the colors and flavors look more evenly balanced. Many glasses are designed to naturally have a slope or angle. The widening towards the rim is so the liquid will flow easier when the glass is tilted up and the drinker will not have to bend their neck as far back. When it comes to the design elements that help to aide in making the beverage, the natural slope of the outer wall and the inner truncated cone work together to compress the bottom of the glass to make the syrup layer appear thicker and fuller with even only a couple of drops added. The inner and outer slope can help with the pour as well. The space between the upper shelf and the outside of the glass is wider which makes it easier to sink the second layer (syrup), yet the shelf is still wide enough to target and float the third layer by pouring it onto the shelf.

The glassware's shape also affects the density of the beverage layers. The inventive glassware makes it easier to create better definition as there is a higher slope to the layers, making the layers thicker and easier to pour.

The utilization of the ingredients and the preparation of the drink makes a significant difference in the appearance and outcome of the recipe. The glassware sets a baseline to aid in making the colors look aesthetically balanced. The mixer may be chilled, if needed, with ice (typically, swirled, rather than shaken). If chilled in the cooler, the glassware will retain cooling temperature for a longer period.

The mixer is added first. Syrup is added at the edge to allow it to sink to the bottom of the glass. Liquor is then floated on the top to create an aesthetically pleasing appearance.

The taste of the mixed drink embodiment in the present invention is distinguished by the color separations, allowing the taster to enjoy an all-in-one, color-changing, and flavor-changing blend in one drink.

In one aspect of the present invention a method of making a multi-layer beverage with a container having a platform disposed in a middle third of an internal chamber of the container includes the following: adding a first liquid to the internal chamber until an upper surface of the first liquid so as to form a top off elevation downward of the platform; adding a second liquid until the top off elevation is approximately coplanar with a plane defined by the platform; and pouring a third liquid on the platform so as to form a layer above the top off elevation.

In another aspect of the present invention the method of making a multi-layer beverage with a container having a platform disposed in a middle third of an internal chamber of the container further includes the following wherein the first liquid has a first density that is less than a second density of the second liquid, wherein the third liquid has a third density that is less than first density, wherein the second liquid is added along an interior surface of a sidewall of the container defining the internal chamber, wherein the third liquid is an alcohol, wherein the first liquid is mixer, wherein the second liquid is a syrup, wherein the platform is defined by an inner truncated cone projecting from a base of the container.

In yet another aspect of the present invention, a container for making a multi-layer beverage includes the following: a frustoconical sidewall extending from a base to a rim, thereby defining a compartment; and a platform being a terminus of a truncated cone projecting from the base to over halfway between the base and the rim, wherein the platform and the base are in a parallel relationship with each other, wherein the truncated cone tapers inward as it extends to toward the rim, while the frustoconical sidewall tapers outward as it tapers to the rim, wherein the truncated cone defines a cavity accessible through an opening in the base, wherein the container is transparent.

These and other features, aspects and advantages of the present invention will become better understood with reference to the following drawings, description, and claims.

DETAILED DESCRIPTION OF THE INVENTION

Figure 1:
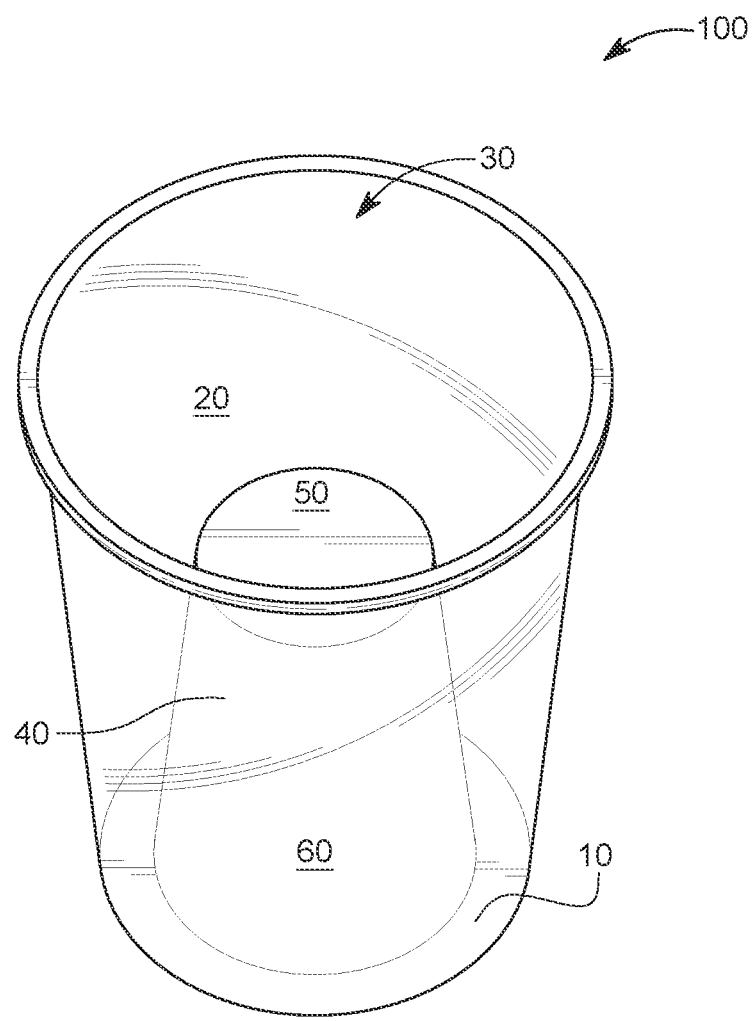
FIG. 1 is a top plan view of an exemplary embodiment of a glassware of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Proper layering is an endeavor the inventor is well versed in, and herein the inventor provides the following practice tips:

Practice Tip 1: Tools of the trade, the layering spoon. When searching for this tool around a bar or restaurant, you are most likely to find it hanging from the Guinness® draught tap handle by a nickel beaded keychain. Many employees in the industry will only know the spoon or use it when pouring a beer layered with Guinness®. There are only about three main beers made by layering Guinness® on top. The most well-known is the Black and Tan, but others include the Blue and Tan, and a Snake Bite. If these beverages are poured slowly, they are simpler and more forgiving drinks to make when it comes to layering. The skill level and knowledge with a layering spoon that is needed to be able to create these recipes can easily be picked-up by beginners. Often times, one or a couple of these recipes are the extent of an employee's knowledge of layering recipes and their skill-set with using a layering spoon.

Due to these limitations, the layering spoon is usually left hanging on the draught handle, and not likely to be used for other drinks that require layering. If the layering spoon is not available or utilized, the most common tool to use instead is a bar spoon. A bar spoon is the utility tool and go-to tool when making many drinks. It is generally used when stirring drinks and garnishes when they are placed in a shaker. The difficulty in using a bar spoon for layering is that it was built for stirring. The barspoon has a drastically extended spiral neck and the bowl can have a variety of heads where one of its main purposes is to be able to reach down into shakers in order to stir up ingredients. It is unlike the head of a layering spoon where the bowl is flattened and symmetrical. When a barspoon is used to layer, the spiral neck is placed against the inside rim of the glass, and an attempt is made to pour the liquid slowly so the liquid rolls down the spiral neck where it either meets the side of the glass or the head of the spoon and builds at the surface level. This practice does not seem to work well when making multiple drinks and it is a very time-consuming pour.

Even when knowing what tools can be used for layering drinks, they are not always practical for specific drinks. A bar spoon has a long neck to reach deep into shakers. When layering smaller drinks like a standard mixed drink, or a shot, good luck holding and steadying a barspoon still with a spiral neck. Although the layering spoon has the best characteristics to layer a liquid, the diameter of the spoon head is slightly larger than the majority of shot glasses. Not only do you need to know how to direct the liquid on the spoon when pouring into a shot glass, but you need to slowly balance the pour so as to not mess up the shot. Even while pouring slowly, it's easy for experienced staff to pour too quickly at some point where too much product is on the layering spoon at once and it forces the new liquid to miss the shot glass or fall into the shot glass and ruin the drink. The last thing bar owners or management like to see is wasted product on the counter, or a poorly made drink. This is only a problem with using a layering spoon for shots, as the diameter of the spoon head is not a problem for pint glasses or mixed drink glasses. The strange part about this is that the largest number of recipes that require layering is for shots.

The recipe disclosed herein takes a good amount of precision to make it consistently across multiple drinks. The inventor utilized the method embodied in the present invention in one of the most compressed and smallest rocks glass available (4.5 oz). Industry glassware can vary from business to business. Some steakhouses can be known for using unusually large glassware primarily for their martinis, but sometimes also for their cocktails as well. They will sometimes serve beverages in standard industry glasses that are double the portions of the normal size, but when they do, they charge a premium for it. This is just another variable which makes the recipe embodied herein difficult to replicate from business to business. The glassware used for the recipe is on the small end of the rocks glass spectrum. Drinks normally poured into a rocks glass, or a low-ball glass are typically 6-8 ounces; but depending on where you go, they can easily reach 10-12 ounces per drink. The recipe's portion size is between a larger mixed shot and a bomb style drink. A shot glass is too small to be used; and the larger glassware described above would not complement the drink. The glassware disclosed herein removes all of these variables where a skilled person is not needed to make the drink, but rather, laws permitting, a laymen could even easily pour the drink consistently as the inventive glassware does the work for them.

Practice tip 2: Layering correctly at the surface level involves the layering spoon being as close as possible to the surface of the level of the existing upper layer so that the pour disperses from the back-center of the spoon and the droplets fall from all sides, whereby the new liquid layer runs down the edges of the spoon rather than the droplets falling and creating ripples in the existing layer. When the new liquid layer drops into the existing layer, it makes the existing layer weaker and weakens the definition between the layers. If the new liquid is poured and layered properly, the layer should spread across the existing layer rapidly. Once an initial new layer is made across the top of the existing layer, it can be easier and faster to build a defined and thicker layer while you continue to pour.

Referring to FIGS. 1-9, the present invention may include a multi-layer beverage glassware 100 used to make a multi-layer beverage. The glassware 100 is transparent.

The glassware 100 has a base 10 and, from a periphery of the base 10, upwardly extending sidewalls 20 that define an opening 30 for admission of liquids. The base 10 forms the bottom of the glassware 100, while the opening 30 defines the top of the glassware 100. The sidewalls 20 may taper outward as they extend to the opening 30.

Figure 2:
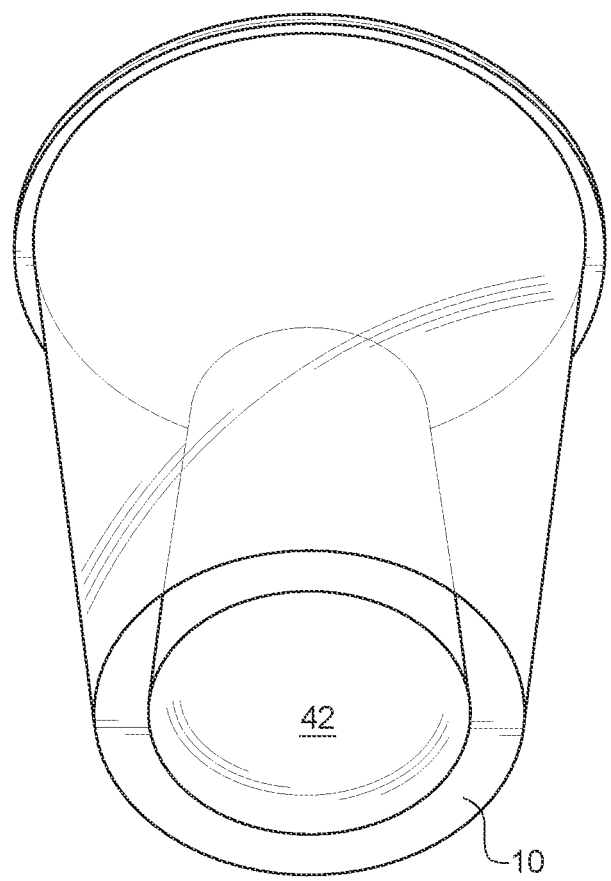
FIG. 2 is a bottom plan view of an exemplary embodiment of the glassware of the present invention.
Figure 3:
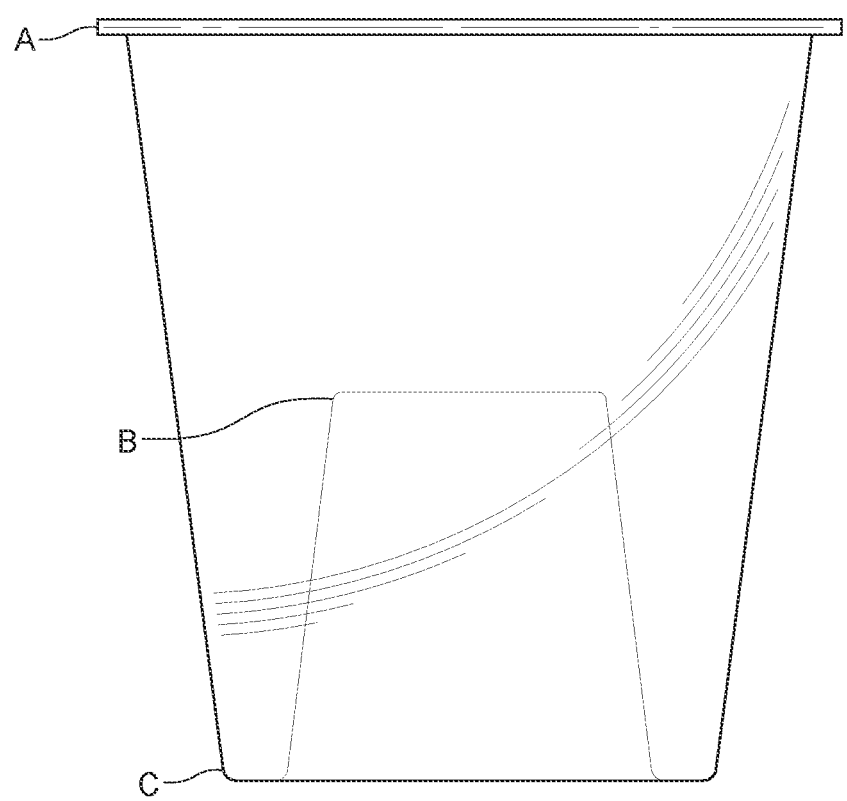
FIG. 3 is a side elevation view of an exemplary embodiment of the glassware of the present invention. The height of the glassware (from 'A' to 'C') may range between two to four inches. The height from the shelf 50 to the rim (from 'A' to 'B') of the glassware may be approximately three-quarters to one and half inches. The height from the base 10 to the shelf (from 'B' to 'C') may be approximately one and a half to two and a half inches. The base 10 may be approximately two to three inches wide/in diameter, with the width/diameter of the bottom of distribution member 40 may be approximately between one and a half to two and a half inches. The width/diameter of the rim of the glassware may be between two and a half inches and four inches.
Figure 4:
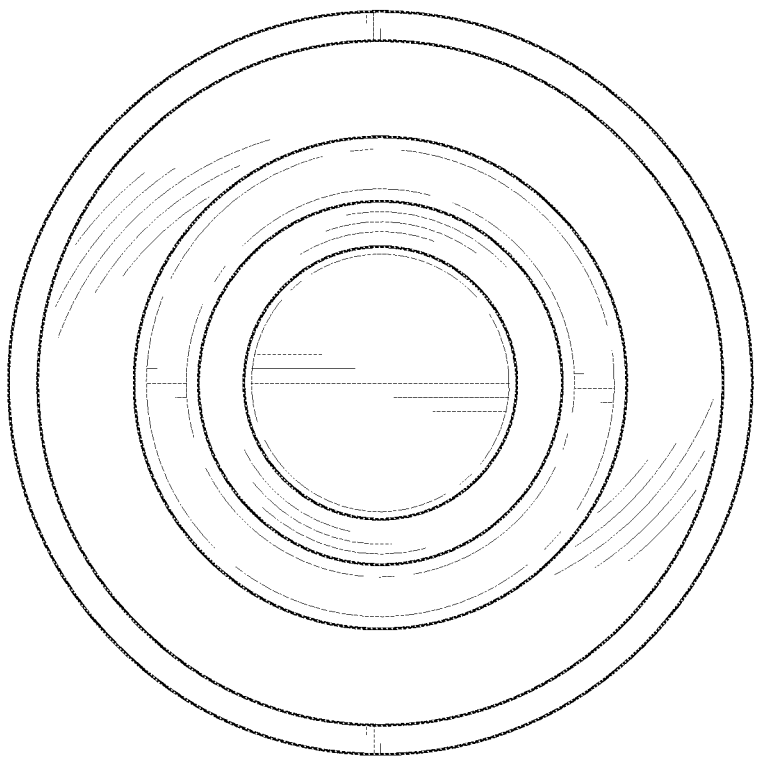
FIG. 4 is a top plan view of an exemplary embodiment of the glassware of the present invention.
Figure 5:
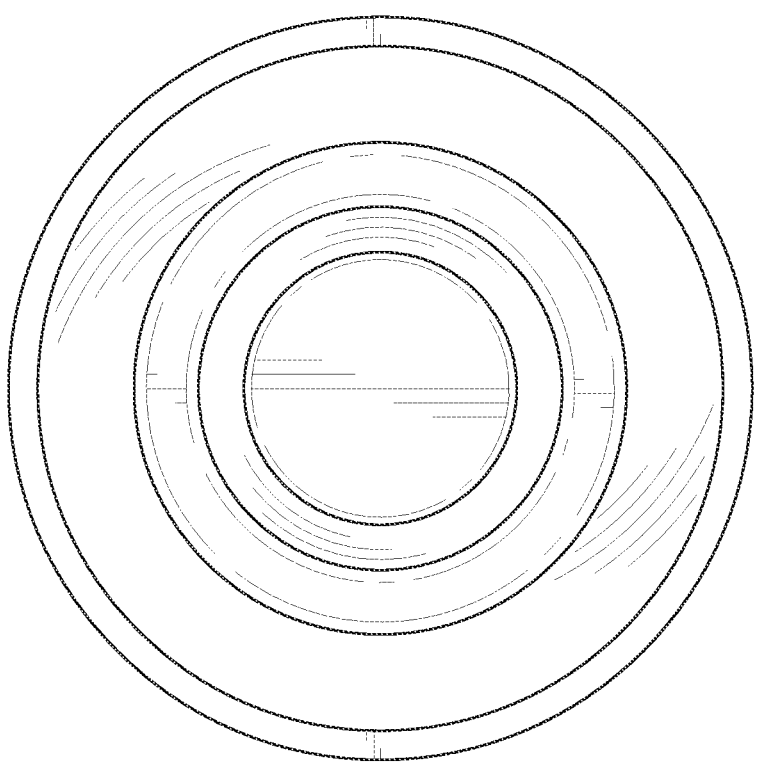
FIG. 5 is a bottom plan view of an exemplary embodiment of the glassware of the present invention.

A distribution member 40 may be centrally disposed along the base 10. The distribution member 40 may have a truncated cone shape with an upper shelf 50. The distribution member sidewalls 60 provides smooth outer walls for an even flow surface for liquid as it flows off the flat upper shelf 50 of the distribution member 40. The upper shelf 50 may be parallel relative to a button surface of the base 10. In some embodiments, the upper shelf 50 may have a curvature (as opposed to being flat) convex, concave or a combination to assist in the layering (analogous to a surface of a (layering) spoon). Moreover, a bottom portion 42 of the distribution member 40 may be open, as illustrated in FIG. 2. As a result, a bottom surface of the base 10 has an opening 42 therethrough. This opening 42 may be filled with liquid (where, conceptually, the inverted glassware 100 could be a shot glass) or solids that can be capped in the volume defined between the opening 42 and the upper shelf 50 (such as ingredients for a kit where the opening 30 is removably sealed and the main compartment of the glassware 100 is filled with a liquid complementary of the solid ingredient). Because the upper shelf 50 closes of that end of the truncated cone, the volume of the truncated cone/distribution member 40 is accessible through the bottom opening 42 and so can be used for storage.

Figure 6:
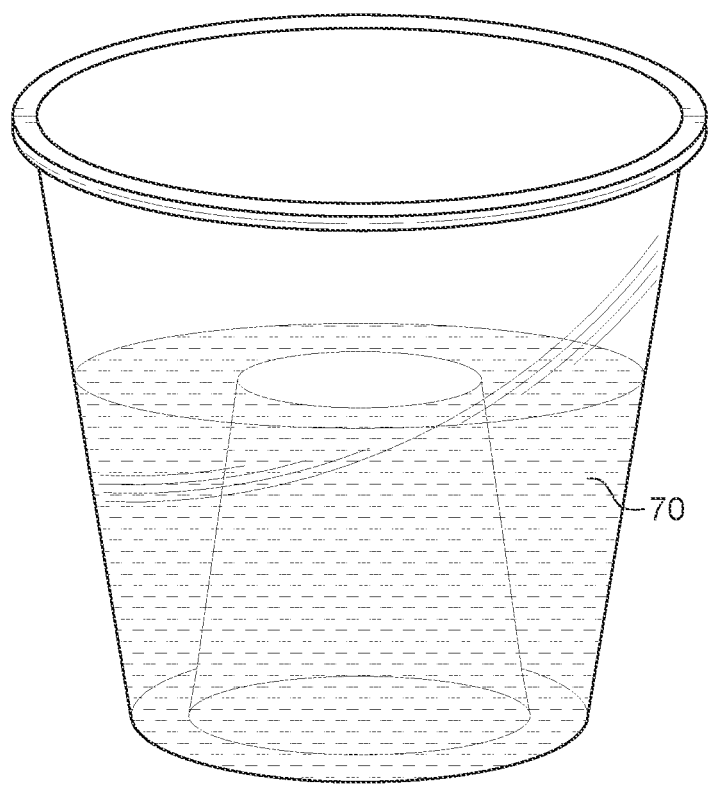
FIG. 6 is a top perspective view of an exemplary embodiment of the present invention, illustrating the glassware with a first liquid.

Referring to FIG. 6, a user may add a first liquid 70 to fill up the cavity defined by the main sidewalls 20 and the distribution member sidewalls 60 so that the first liquid 70 plateaus at the flat upper shelf 50, as illustrated in FIG. 6. The first liquid 70 may be a mixer, e.g., an optionally chilled lemonade or the like, having a first color. The first liquid 70 has a first density.

To manually chill the lemonade (or mixer), a user may fill a shaker halfway with ice. Pour the lemonade into a shaker. Seal the shaker and rotate/swirl the shaker clockwise three times, then counterclockwise three times. This is a good quick-chill method. Next, the user would take the top off, and strain it into the glassware 100 until it is an appropriate distance to the top of the glass.

Figure 7:
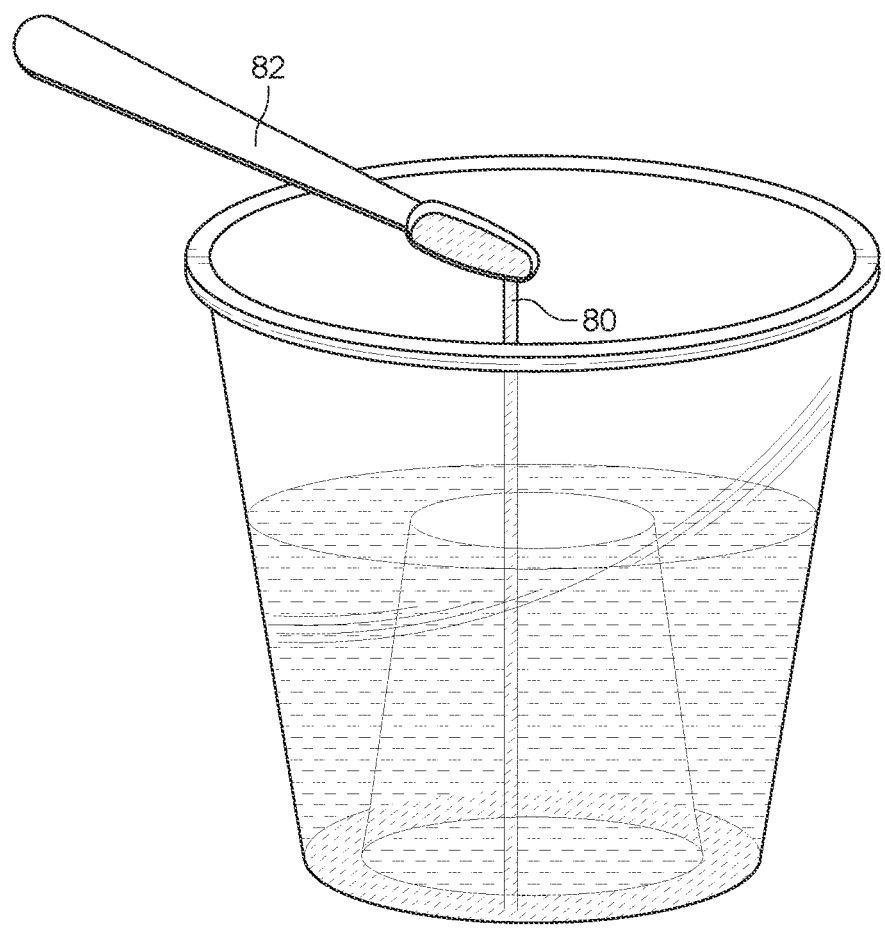
FIG. 7 is a top perspective view of an exemplary embodiment of the present invention, illustrating an addition of a second liquid to the glassware.

Referring to FIG. 7, a user may add a second liquid 80 directly down the inner surface of the main sidewall 20 in one fluid motion. The second liquid 80 has a second density which is greater than the first density of the first liquid 70, and thus the heavier second liquid 80 settles along the base 10. The second liquid 80 may have a second color.

The second liquid 80 may be cherry grenadine (or syrup) that is poured directly down the edge of the main sidewall 20 of the glassware 100 in one fluid motion by way of a layering spoon 82. The pour may be only small drops, but the second color spreads, and the glassware works to accentuate the spreading of the second color.

Figure 8:
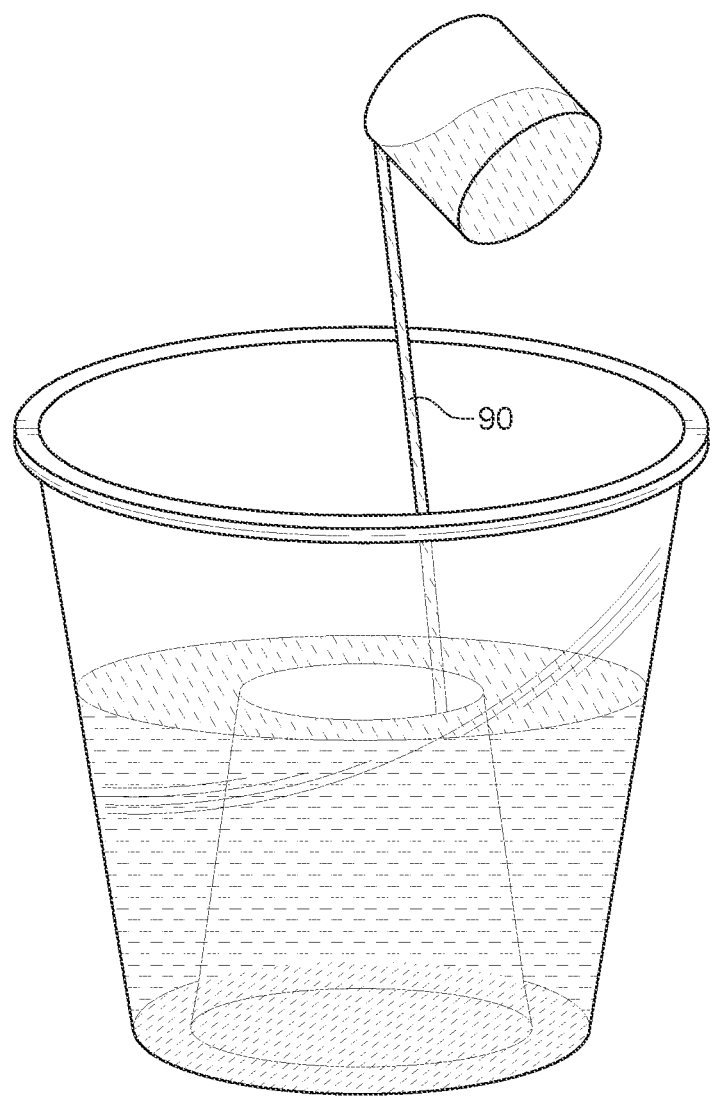
FIG. 8 is a top perspective view of an exemplary embodiment of the present invention, illustrating an addition of a third liquid to the glassware.
Figure 9:
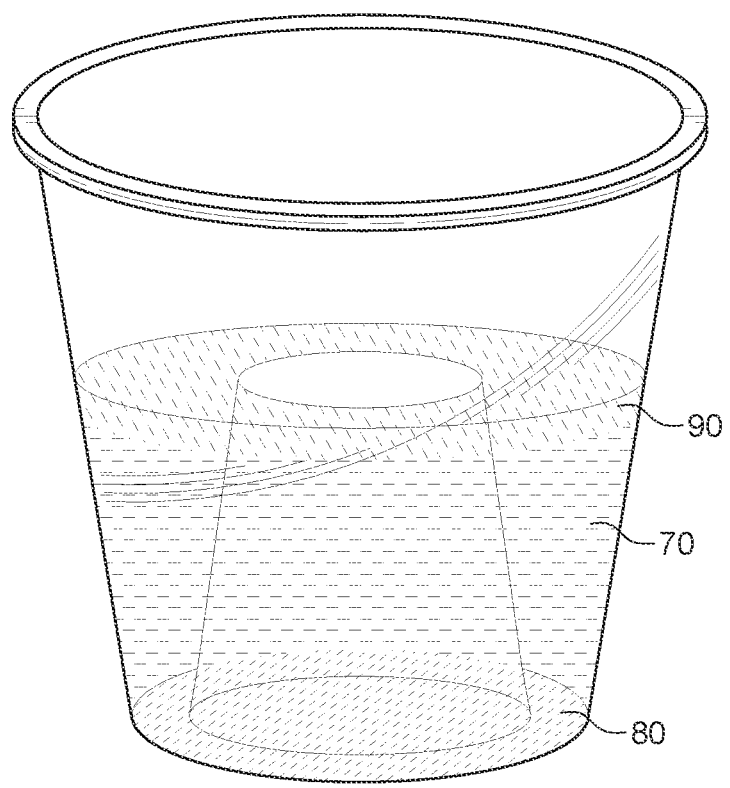
FIG. 9 is a top perspective view of an exemplary embodiment of the present invention, illustrating the glassware containing the first, second, and third liquid.

Referring to FIG. 8, the user may "float" a third liquid 90 by pouring it off the upper shelf 50. The third liquid 90 may be an alcoholic beverage or cooler. The third liquid 90 may have a third color and a third density, wherein the third density is less than the first density. The layering spoon 82 may be used to help disperse the third liquid 90 (or alcoholic beverage) along the surface. Please note that even though the layering spoon 82 is shown with the concave surface upward facing in FIG. 8, it is understood that a practitioner can rotate the layering spoon 82 so that the convex surface is upward facing and have a liquid run of that surface as disclosure earlier in the application.

Floating the last layer can be tricky, but important as it prohibits the alcohol top layer from dropping below the surface of the first liquid layer 70 and instead spreads the third liquid 90 out across the top of the upper surface of the first liquid 70. In other words, the upper shelf 50 acts as a layering mechanism (like a layering spoon) while still being a part of the glassware 100.

The previously added first and second liquids 70 and 80 can impact the division of the color-changing levels. Two other factors that can alter the blend's appearance are the water content added when chilling the first liquid 70 (or mixer), and the speed/intensity of pouring the third liquid 90/final layer. The third liquid 90 (or alcoholic beverage) should be poured slowly by tilting it back and forth when pouring it over the layering spoon 82 or another container. This will slow the droplets coming off the layering spoon from breaching too far past the surface level before floating and creating the new third surface level. The initial process of pouring it slowly, and rocking the alcoholic beverage back and forth, will help create a more definitive line between layers. The third liquid 90 (alcoholic beverage) can then be poured faster once the definitive line has been created.

There is an aesthetically pleasing art to the drink that results from the present invention, which visually appeals to the customer and makes them wish to purchase one without even necessarily wanting to consume it. It can become a source of social entertainment where people want to buy, display, and share the drink's likeness to show friends what they are consuming on a hot day.

In certain embodiments, the first liquid 70 could be a citrus drink, like lemonade, limeade, lemon juice, or lime juice, sweet and sour mix, an energy drink mixer, or the like. The first color could be white or slightly yellow in color, while in daylight a yellow-colored mix of this liquid usually appears more white in color.

The second liquid 80 could be cherry juice, cherry, grenadine (syrup), or the like. The second color could be red in color.

The third liquid 90 could be blue raspberry alcohol; generally, a vodka or a liqueur. It is noted that liqueur is different from liquor, whereas liquor is pretty much all bottled alcohol in general, liqueur refers to a specific type with certain characteristics. Also note that not all liqueurs can work for floating a layer as sugar tends to drag the layer down (which is why the syrup is on the bottom, for having a higher sugar content). Alcohol with less sugar tends to float. This could also be a malted beverage. The third color could be blue in color.

There are blue raspberry syrups around, along with cherry vodkas. As of now these products are not sufficient for layering, but the inventive glassware 100 enables these alternatives.

Referring to FIGS. 10A through 15, the present invention contemplates a self-contained configuration 130 of the glassware 100.

Figure 10A:
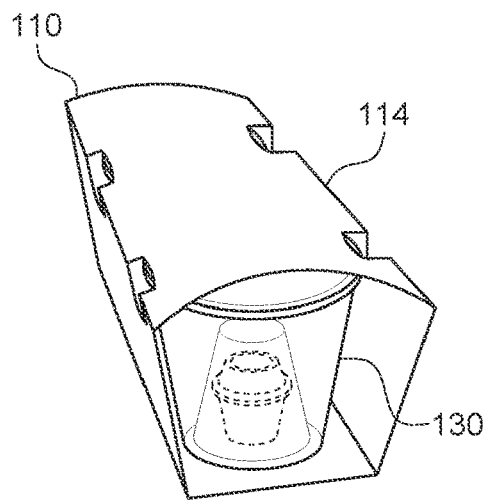
FIG. 10A is a top side perspective view of an exemplary embodiment of the present invention, illustrating a packaged condition of a plurality of self-contained configuration of glassware.

FIG. 10A is a top side perspective view of an exemplary embodiment of the present invention, illustrating a packaging 110 for a second and third liquid container 120. It should be understood that even though only two second and third containers 120 are illustrated side by side in the packaging 110, that the invention contemplates alternative embodiments contemplated herein, for instance, two second and third containers 120 stacked on two other containers 120, for a total of four containers 120, as well as other arrangements.

Figure 10B:
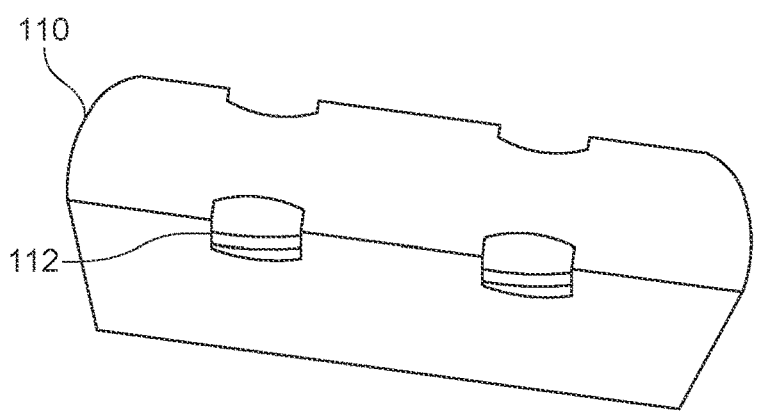
FIG. 10B is a top front perspective view of an exemplary embodiment of the present invention in the package condition.

FIG. 10B is a top front perspective view of an exemplary embodiment of the present invention, illustrating the second and third liquid container 120, wherein the packaging 110 provides openings 112 for securing a portion of a plurality of the second and third containers 120.

Figure 10C:
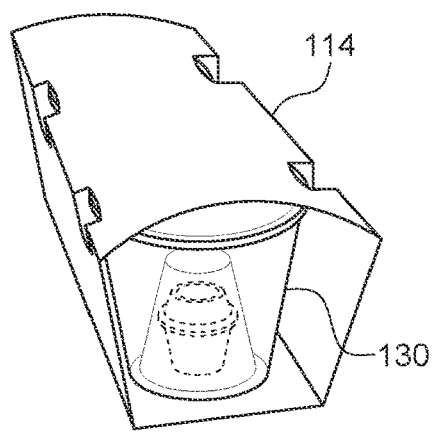
FIG. 10C is a top side perspective view of an exemplary embodiment of the present invention in the packaged condition.

FIG. 10C is a top side perspective view of an exemplary embodiment of the present invention, illustrating a closed packaging 114 for the second and third container 120.

Figure 11:
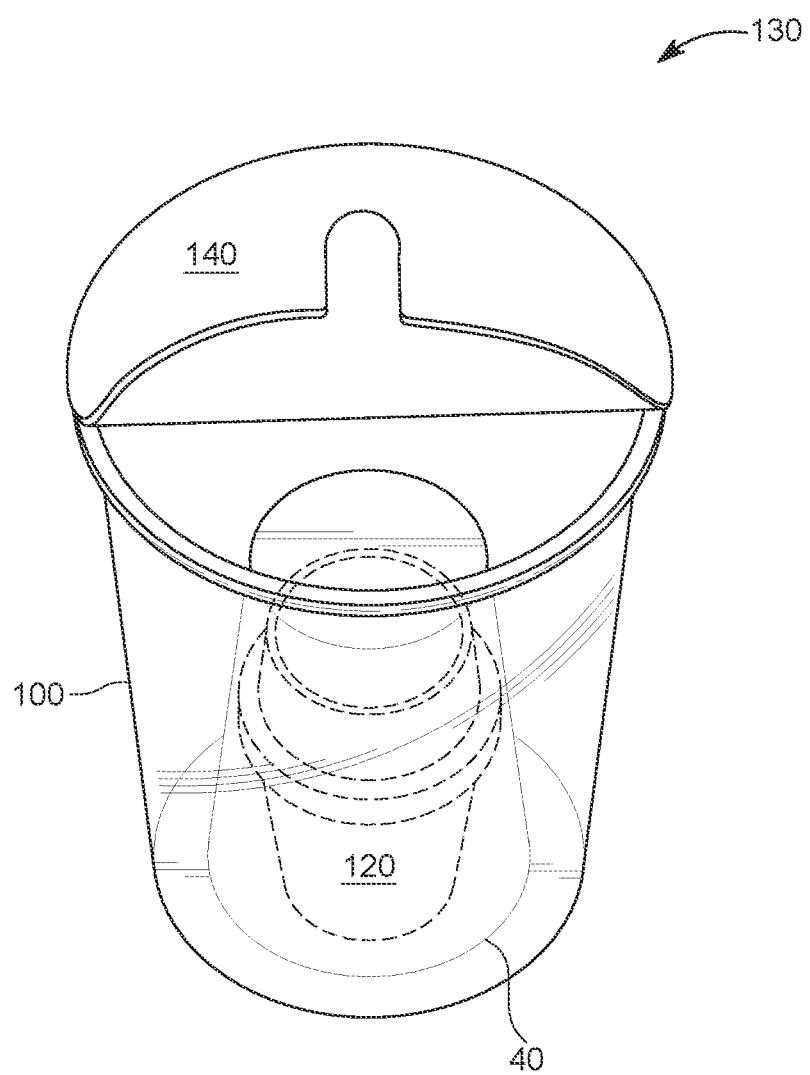
FIG. 11 is a top perspective view of an exemplary embodiment of a self-contained configuration of the glassware.

FIG. 11 is a top perspective view of an exemplary embodiment of a self-contained configuration 130 of the glassware 100, wherein the second and third liquid container 120 is housed in the cavity defined by the distributive member distributive member 40 of the glassware 100. The self-contained configuration 130 has an upper seal 140 covering the upper opening 30 of the glassware 100 and a lower seal 142 covering the opening to the bottom cavity (of the distributive member 40). In one embodiment of the self-contained configuration 130 the first liquid 70 is sealed into the main compartment of the glassware 100 by way of the upper seal 140. The upper seal 140 is peelable other otherwise detachable from the rim or lip of the upper opening 30.

Figure 12:
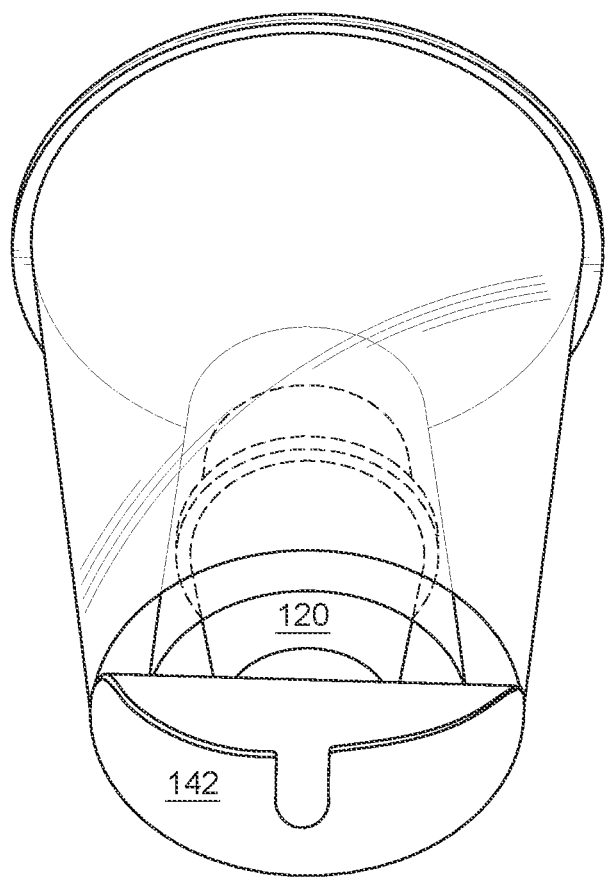
FIG. 12 is a bottom perspective view of an exemplary embodiment of a self-contained configuration of glassware.

FIG. 12 is a bottom perspective view of an exemplary embodiment of a self-contained configuration 130 of the glassware 100, illustrating the peel-away lower seal 142 partial removed from the seal it forms with at least the opening 42, if not the entirety of the bottom surface of the base 10. As a result, the second and third container 120 can be removable stored in the lower cavity of the glassware 100, where in the self-contained configuration, comes with the first liquid 70 so that after a user removes the second and third liquid container 120, they can sequentially add the second liquid 80 and then the third liquid 90 to the upper compartment as described in more detail herein.

Figure 13:
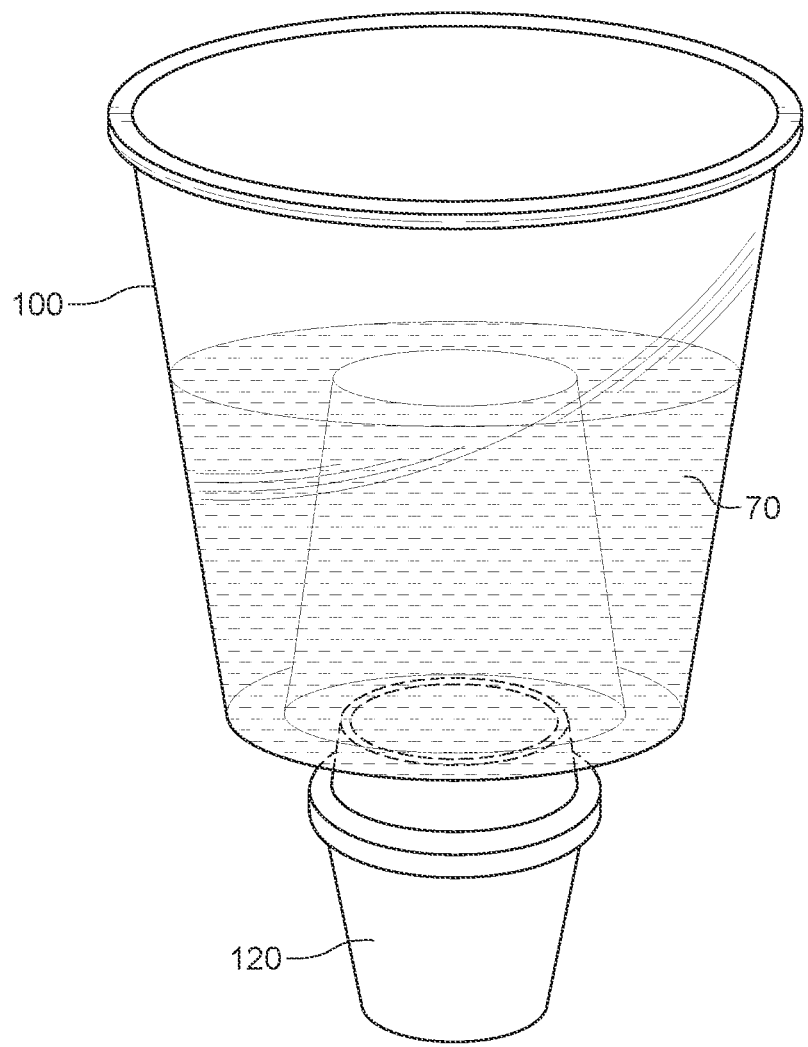
FIG. 13 is an exploded perspective view of an exemplary embodiment of a top portion of the second and third liquid container.

FIG. 13 is a perspective view of an exemplary embodiment of the self-contained configuration 130 of the glassware 100, illustrating the removal of the second and third liquid container 120 from the lower cavity.

Figure 14:
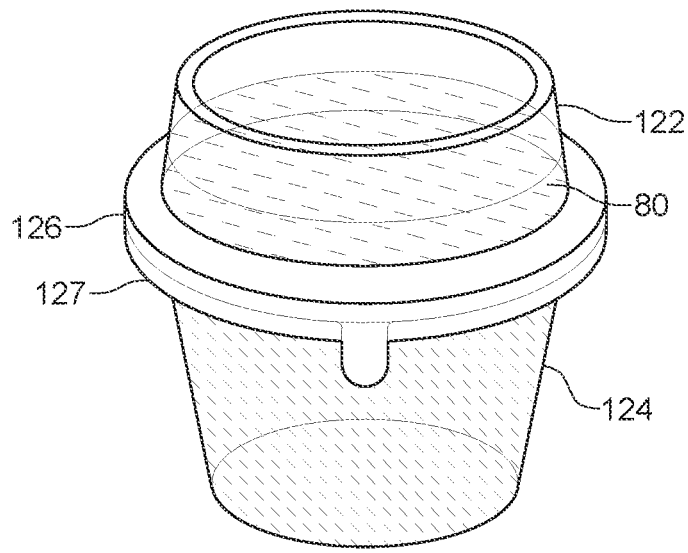
FIG. 14 is a perspective view of an exemplary embodiment of the second and third liquid container.

FIG. 14 is a perspective view of an exemplary embodiment of the second and third liquid container 120 illustrating how its top portion 122, containing the second liquid 80, and its bottom portion 124, by way of their respective top and bottom connectors 126 and 127.

Figure 15:
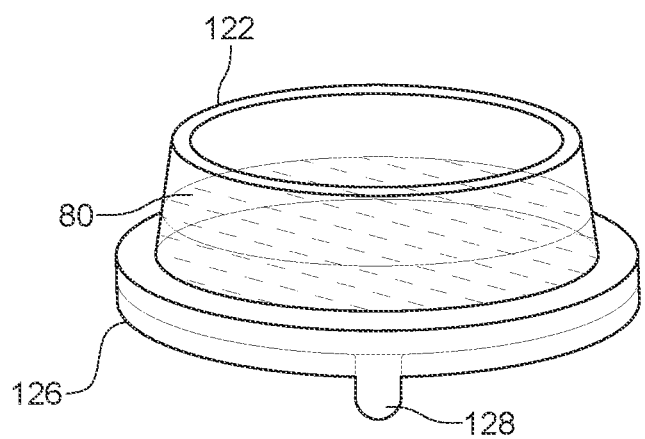
FIG. 15 is an exploded perspective view of an exemplary embodiment of the second and third liquid container.
Figure 15:
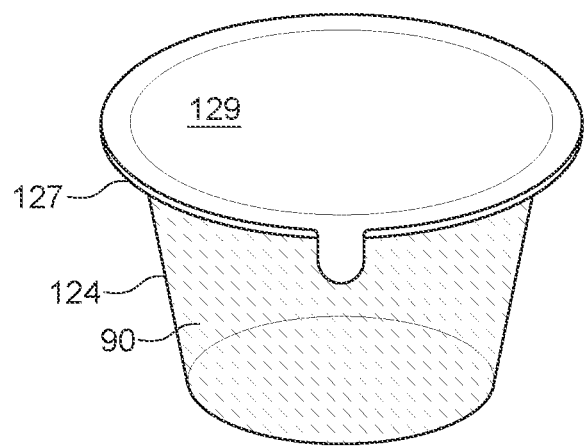

FIG. 15 is an exploded perspective view of an exemplary embodiment of the second and third liquid container 120 illustrating how its top portion 122 can separately store the second liquid 80 therein by way of a top removable seal 128.

Also illustrated is how a bottom portion 124 of the second and third liquid container 120 can separately store the third liquid therein by way of a bottom removable seal 129. Also illustrated in top and bottom connectors 126 and 127, along the respective openings of the top portion 122 and the bottom portion 124, which enable the top portion 122 to separate from the bottom portion 124 to facilitate implementation.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the present invention.

What is claimed is:

1. A method for making a multi-layer beverage with a container having a platform having no openings disposed in a middle third of an internal chamber of the container, wherein the platform is disposed in the internal chamber, the method comprising:
   adding, to the internal chamber, a first liquid a so that a first upper surface thereof tops off downward of the platform;
   adding, to the internal chamber, a second liquid until the first upper surface is approximately coplanar with a plane defined by the platform; and
   pouring a third liquid directly on the platform so that a layer of the third liquid forms only at or above the first upper surface.

2. The method of claim 1, wherein the first liquid has a first density that is less than a second density of the second liquid.

3. The method of claim 2, wherein the third liquid has a third density that is less than the first density.

4. The method of claim 3, wherein the second liquid is added along an interior surface of a sidewall of the container defining the internal chamber.

5. The method of claim 4, wherein the third liquid is an alcohol.

6. The method of claim 5, wherein the first liquid is a mixer.

7. The method of claim 6, wherein the third liquid is a syrup.

8. The method of claim 7, wherein the platform is defined by an inner truncated cone projecting from a base of the container.

9. The method of claim 8, wherein the platform may be flat.

10. The method of claim 8, wherein the container has the base has a planar bottom surface extending between the inner truncated cone and an inner wall of the container that defines the internal chamber.

11. The method of claim 8, wherein the platform is flat.

* * * * *